United States Patent [19]  [11] 3,954,605
Davies et al.  [45] May 4, 1976

[54] WASTE TREATMENT PLANTS

[75] Inventors: Robert John Davies, Kent; Dennis George Blows, Essex, both of England

[73] Assignee: Foster Wheeler John Brown Boilers Limited, London, England

[22] Filed: Oct. 15, 1974

[21] Appl. No.: 514,708

Related U.S. Application Data

[63] Continuation of Ser. No. 312,559, Dec. 6, 1973, abandoned.

[52] U.S. Cl............................ 210/7; 210/10; 210/71
[51] Int. Cl.² ..................... C02C 1/08; C02B 1/36
[58] Field of Search............. 110/8 A, 8 R; 210/10, 210/44, 63, 71, 152, 175, 195, 196, 199, 202, 206, 221, 5–8, 15

[56] References Cited
UNITED STATES PATENTS

| | | | |
|---|---|---|---|
| 3,306,236 | 2/1967 | Campbell | 110/8 R |
| 3,549,010 | 12/1970 | Marsh et al. | 210/71 |
| 3,563,188 | 2/1971 | Prosser et al. | 110/8 A |
| 3,605,655 | 9/1971 | Warshawsky et al. | 110/8 R |
| 3,622,508 | 11/1971 | Komline | 210/44 X |
| 3,652,405 | 3/1972 | Hess et al. | 210/71 X |
| 3,687,646 | 8/1972 | Brent et al. | 110/8 R |
| 3,707,464 | 12/1972 | Burns et al. | 210/44 |
| 3,738,289 | 6/1973 | Hanway, Jr. | 110/8 R |
| 3,741,890 | 6/1973 | Smith et al. | 210/71 X |

*Primary Examiner*—Charles N. Hart
*Assistant Examiner*—Robert H. Spitzer
*Attorney, Agent, or Firm*—Pollock, Vande Sande & Priddy

[57] ABSTRACT

This invention relates to the treatment of wastes including sewage, solids which may include both combustible and incombustible solids, and optionally waste fuel such as oil. The invention provides a method and plant for treating wastes in which solids are converted to an incineratable form which, in a first embodiment, is incinerated with the sewage solids obtained by separating the sewage into a sewage solids component and a clarified waste water component together with additional fuel if necessary, at least a part of said clarified waste water component being optionally incinerated to control temperatures during incineration, and any remaining waste water being disinfected. In a second embodiment the incineratable material is incinerated with the sewage together with the waste fuel and additional fuel if necessary. The invention has the advantage that it is applicable to all types of waste, and the products of incineration are deodorized waste gases, incombustible and sterile ash, and in one embodiment additionally disinfected waste water, thus avoiding pollution problems.

10 Claims, 2 Drawing Figures

WASTE TREATMENT PLANTS

This is a continuation of application Ser. No. 312,559, filed Dec. 6, 1972, now abandoned.

This invention relates to waste treatment. More particularly the invention relates to the treatment and disposal of all solid, liquid and noxious gaseous products from domestic, industrial or commercial wastes and to a plant for this treatment.

The problem of disposal of such wastes is very difficult for remotely situated commercial or domestic communities, e.g. motels, hotels and similar establishments, and also similar problems arise in ships.

BACKGROUND TO THE INVENTION

As far as ships are concerned, current practice is to dump liquid and solid wastes in mid-ocean without any treatment. This is reasonably acceptable for biodegradeable materials but the increasing use of non-degradeable materials such as plastics means that this is a source of pollution due to floating debris. Ships are prohibited from discharging untreated wastes in ports, harbours and coastal waters and so storage tanks are usually provided in which the wastes are stored for discharge in deeper waters. This solution is unlikely to be acceptable in the future as pollution control measures cover a greater proportion of coastal and enclosed areas because of the excessive size of the storage tanks required.

Sewage and domestic waste can be treated by biological degradation, but this is susceptible to interference by the presence of salt water and this implies, in a marine environment, an unacceptable degree of reliability. In addition, the biological degradation of these wastes leads to the formation of a treated liquid effluent and an associated quantity of sludge consisting of non-degradeable residues and micro-organisms. This sludge requires to be stored for subsequent treatment or discharge in ocean waters. Treatment of wastes by chemical means is also available but the cost of dosing the total waste in this manner is expensive.

The increasing use of plastic non-degradeable materials for packaging, disposable utensils and containers constitutes a major pollution threat in that many of these articles are of low density and, if discharged overboard, will remain floating for an indefinite period of time. There is growing disquiet at the accumulation of this debris in ports, harbours and beaches adjacent to sea lanes, and pressure is mounting for legislation to prohibit these discharges, similar to that which prohibits discharge of oily wastes into water.

Many, if not all, of these considerations also apply to the problems of waste disposal at remotely situated inland sites.

It is therefore, an object of this invention to provide a waste treatment plant which can accept all such forms of waste for disposal in a way which reduces or avoids pollution.

BRIEF SUMMARY OF THE INVENTION

According to the invention there is provided a waste treatment method for wastes including sewage, combustible and/or incombustible solids, and optionally waste fuel such as oil, in which the combustible and/or incombustible solids are converted to an incineratable form, i.e., a form in which the solids are capable of being fed to the fluidized bed region of a fluidized bed, the converted solids are incinerated with the sewage if sufficient waste oil is added to the incinerator to maintain combustion, and/or with the sewage solids resulting from separating the sewage into clarified waste water and sewage solids, and fuel when necessary, to give a deodorized waste gas which can be vented to the atmosphere and incombustible and sterile ash, the clarified waste water being incinerated with the solids and sewage solids if required to control the temperature during incineration and any remaining clarified waste water being disinfected to give a dischargeable or reusable waste water.

Also according to the invention there is provided a waste treatment plant for the treatment of wastes including sewage, combustible and/or incombustible solids, and optionally waste fuel such as oil, comprising a means for converting the combustible and/or incombustible solids to an incineratable form, i.e., a form in which the solids are capable of being fed to the fluidized bed region of a fluidized bed, means for feeding the converted solids into the fluidisable bed of a fluidised bed incinerator, means for feeding the sewage directly into the fluidisable bed or to a sewage treatment plant for separating solids and water from which the separated sewage solids are arranged to be fed to the fluidisable bed, and means for feeding at least part of the separated water into the fluidisable if necessary to control the temperatures during incineration and any remaining water into a disinfector.

Thus, according to the invention provision is made to treat all liquid and solid wastes and optionally the noxious gases produced during the treatment giving as products an inoffensive ash which is sterile and disposable, deodorised gases and optionally if the sewage is separated into clarified waste water and sewage solids waste water which can safely be dumped in the sea if the plant is carried on board a ship or discharged into a river or the sea or soak-away if the plant is on the land since it contains substantially no solids and has been disinfected to render it harmless. Also the disinfected waste water can be reused e.g. as flushing water for toilets. The incinerated solid product is in a form which can also be dumped if at sea since it will readily sink or it can be stored and dumped on land as indeed can be the case if the plant is located ashore. This solid product is completely inoffensive and so its disposal ashore does not give any problem. The gaseous product is a deodorised gas which can satisfactorily be vented to the atmosphere.

The plant according to the invention accepts all waste products and can be relatively compact which makes it eminently suitable for use on board ships. It is, however, equally useful ashore and is ideal for use in remotely situated land sites.

The sewage wastes can include all bio-degradeable or wet wastes, and liquids can include domestic sewage, i.e. discharges from W.C.'s, latrines, urinals, wash basins, together with the wastes from services such as wash waters from laundry and solid and liquid cooking wastes, while the combustible and/or incombustible solids can include food and packaging wastes associated with food preparation.

Where the plant is used on board ship, any quantities of waste fuel oils can be sent to the incinerator for disposal and this avoids the pollution which would result if they were merely discharged into the sea.

Preferably, the sewage waste before separation into solids and liquids, if this is performed, is partially oxidised. The separation into liquid and solids can be made in any convenient way but is preferably achieved by flotation. Thus air can be dissolved in the mixture under pressure and then the pressure released so that the resulting liberation of fine air bubbles raises the solids to the surface where they can be separated off from the clarified liquid.

It has been found by the Applicants that when the waste which is passed into the incinerator is wet, or at least damp the combustion of the waste is improved.

In one aspect of the invention, the sewage wastes containing wash wastes, discharges from W.C.'s etc, are fed together with the macerated or pulped combustible and/or incombustible solids directly into the incinerator. However, this is only expedient if the quantity of fuel such as waste oil being fed to the incinerator is sufficient to maintain combustion in the incinerator. In the case where sufficient waste oil is not available, the sewage, before passing to the incinerator, is separated into sewage solids and clarified waste water which is optionally incinerated, to control the temperatures during incineration, while any remaining clarified waste water is disinfected to give a dischargeable or reusable water. Incineration of waste water to provide cooling is necessary if the wastes have a particularly high calorific value.

BRIEF DESCRIPTION OF THE DRAWINGS

A waste treatment plant according to the invention for use on board a ship will now be described, by way of example, with reference to the accompanying drawings in which.

DESCRIPTION OF THE PREFERRED EMBODIMENTS

Figure 1:
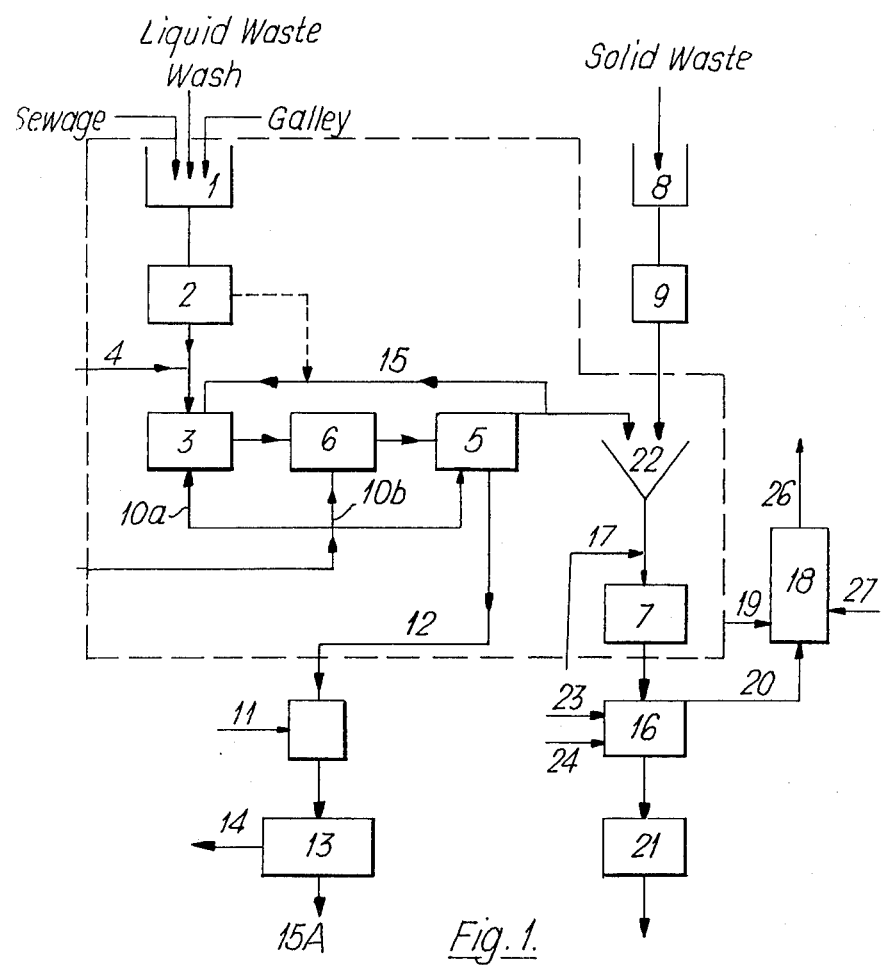
FIG. 1 is a schematic diagram showing the various stages in the method according to the invention.

Sewage, including wash waters, domestic and galley wastes pass to a reception tank 1 shown in FIG. 1. They are withdrawn via a macerator 2 into an aeration compartment 3 where provision is made for the injection of air through a line 10a. The residence time of the combined wastes in this tank is insufficient completely to degrade (oxides) the wastes as in 'extended aeration'. Provision is also made for the introduction of suitable chemical floculating aids through a line 4 for admixture with the wastes prior to the separation of the insoluble portion of the wastes in a flotation chamber 5. However, equally satisfactory results can be achieved if the aeration compartment 3 is omitted, and the combined wastes passed directly from the macerator 2 to the pressure aerator 6.

Flotation is achieved by dissolving air under pressure from a line 10b in the pressure aerator 6. The wastes are then depressurised in the flotation chamber 5 causing the liberation of fine air bubbles which transport the floculated solid particles to the surface of the flotation chamber from which it may be moved by means of a skimming device (not shown). The clarified liquor pass via a line 12 and is mixed with a suitable disinfectant from line 11, e.g. chlorine, prior to discharge through a line 15A from a treatment tank 13. A portion of this disinfected liquor may be recycled through line 14 to provide flushing means to W.C.'s urinals and latrines.

A portion of the sludge skimmed from the flotation chamber 5 is returned through a line 15 to the aeration compartment 3 to maintain a relatively high concentration of sludge in order to effect some degree of biological degradation together with more effective flotation separation, the remainder being passed into a mixed sludge hopper 22, to which pulverised dry wastes from a solid waste reception hopper 8 pass via a pulveriser 9.

The combined wastes from the hopper 22 are introduced via a suitable feed mechanism 7, e.g. a screw conveyor into an incinerator 16 to oxidise the wastes into a relatively small volume of inert ash which is withdrawn through an ash hopper 21 for subsequent disposal. Any waste oils are similarly introduced through a line 17 for combustion. Provision is made for the supply of fuel through line 23 and air through line 24 to maintain combustion in the incinerator 16.

In order to prevent the escape of noxious gases, the tank 1, macerator 2, compartment 3, chamber 5, aerator 6, hopper 22 and feed mechanism 7 are all enclosed within one or more airtight compartments and the exhaust gases from these are ducted through a line 19 to an afterburner 18 which also receives furnace gases through a line 20 from the incinerator 16. Fuel is supplied by a line 27 to the afterburner to raise the temperature of this flue gas/foul air mixture to a temperature of about 800°C which, as a consequence, deodorises the mixture leading to an inoffensive, gaseous discharge through a line 26.

Suitable incinerators 16 are shown and described in our copending patent application Ser. Nos. 57590/71 and 46713/72, and when these are used the afterburner 18 and fuel line 27 can be omitted, the line 19 which carries the exhaust gases passing directly to the incinerator 16.

Figure 2:
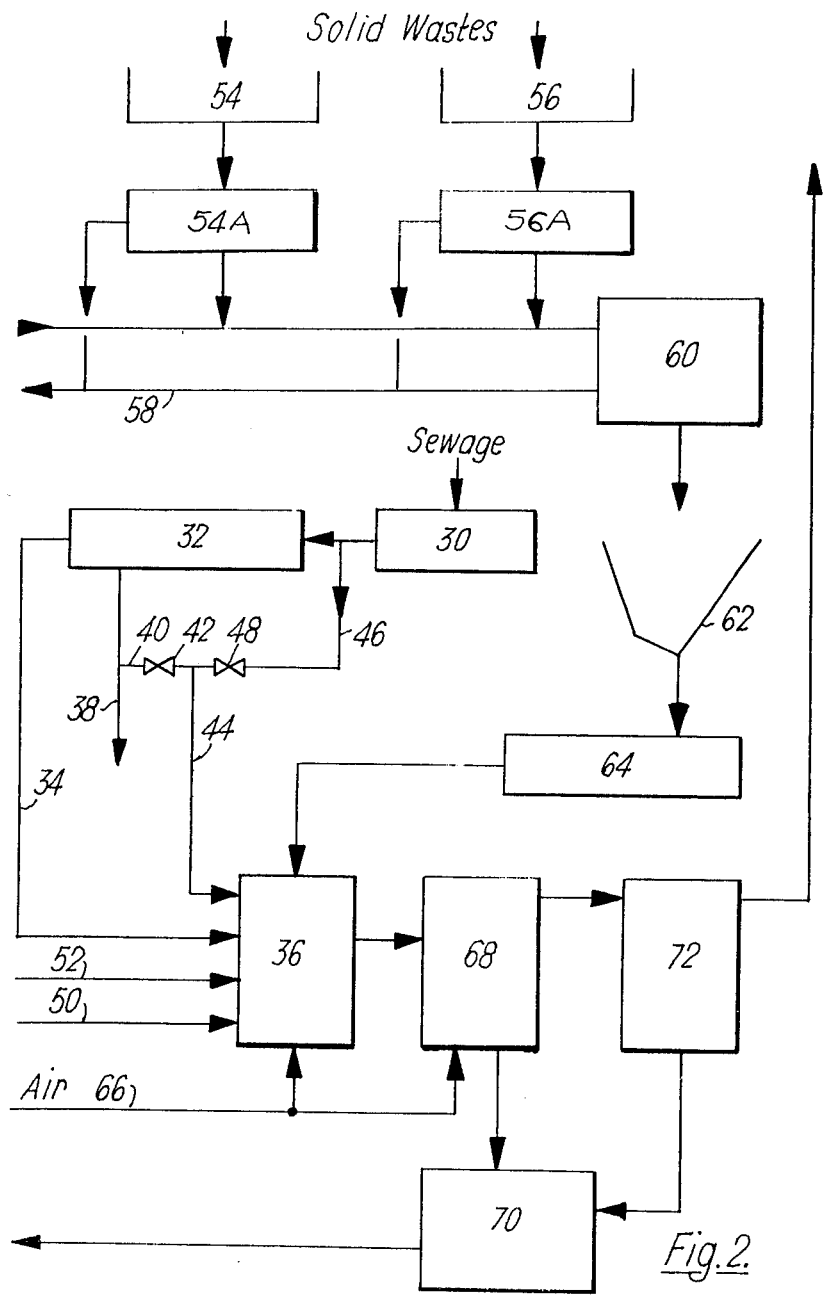
FIG. 2 is a schematic diagram showing the various stages in an improved method according to the invention.

In FIG. 2, the sewage including wash waters, domestic and galley wastes pass to macerator 30 and are withdrawn into a sewage treatment plant 32 which may comprise the pressure aerator 5, flotation chamber 6, and aeration tank 3, illustrated in and described with reference to FIG. 1. Provision is thus made in the sewage treatment plant for separating the sewage solids from the clarified water waste, and the sewage solids are passed through a line 34 to the incinerator furnace 36. The clarified water waste can be discharged through a line 38 and disinfected to provide a dischargeable or reusable water, or alternatively part of the water waste can be withdrawn through a line 40, valve 42 into a line 44, and thence into the incinerator 36 to control the temperatures during incineration.

It is also possible for the sewage to be withdrawn through a line 46 and valve 48, and thus partly or completely bypass the sewage plant 32, providing sufficient waste oil is being passed through the line 50 into the incinerator.

Solid wastes are either passed into a macerator 54 via 54A or hydropulper 56, via 56A the latter being suitable, for example, for paper wastes. Water used in the macerator 54 and hydropulper 56 are passed to a water-return line 58, while the macerated and hydropulped solid wastes are passed to a dewatering press 60. Water from this press is passed into the water return line 58, and the pulped solid wastes are passed to a hopper 62, and thence via a pump feeder 64 to the furnace 36.

Fuel oil when necessary is also passed via the line 52 into the incinerator 36, which is preferably of the type shown and described in our copending patent application Ser. Nos. 57590/71 or 46713/72. If the latter incinerator is used, fluidizing air can be supplied through an air line 66 to the incinerator 36 and to the cooler 68.

Ash and other incombustible solids are withdrawn into a container 70 from which they can be dumped in the sea if the plant is carried via ship, or transferred to a suitable dumping site if the plant is on land, the clarified liquid being discharged into the sea, river or soaked away if the plant is on land.

The flue gas leaving the cooler 68 can be passed through a cyclone 72 to remove dust before passing the deoderized gaseous porudct to the atmosphere.

As will be appreciated the plant shown in the drawings is relatively simple and compact and can deal effectively with those wastes thereby minimizing pollution.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. A method of disposing of domestic sewage wastes and solid materials in a remotely situated land site or on board a ship employing a fluidized bed incinerator wherein said solid material is selected from the group consisting of combustible solid material, noncombustible solid material, and mixtures thereof; which comprises:
   A. passing the sewage wastes into a reception zone;
   B. passing said sewage wastes, after being collected in said reception zone, to a macerator, and macerating said sewage wastes in said macerator;
   C. introducing flocculating aids to said sewage wastes after said sewage wastes have been macerated in said macerator;
   D. passing said sewage wastes to a pressure aeration zone and dissolving air under pressure into said sewage wastes;
   E. then passing said sewage wastes to a flotation zone and liberating fine air bubbles therein and thereby transporting flocculated solid particles to the surface of the flotation zone and thereby separating said sewage wastes into a pulp capable of being fed to a fluidized bed incinerator, and a clarified liquor;
   F. disinfecting said clarified liquor and then reusing said clarified liquor in said remotely situated land site or on board said ship or passing it to the fluidized bed incinerator;
   G. returning part of said pulp to said pressure aeration zone;
   H. passing said pulp which has not been returned in step (G) to a feeding zone of said incinerator;
   I. passing said solid materials to a pulverizing zone and therein converting said solid material to an incineratable form in which said solid material is capable of being fed to the fluidized bed region of said fluidized bed incinerator;
   J. providing combustion conditions in said fluidized bed incinerator;
   K. passing said solid materials to said feeding zone;
   L. mixing said pulp and said solid materials in said feeding zone of said incinerator;
   M. feeding the mixture obtained in step (L) directly to the fluidized bed region of said fluidized bed incinerator;
   N. introducing any waste oil from said remotely situated land site or from on board said ship into said fluidized bed incinerator;
   O. supplying fuel and air to said fluidized bed region of said fluidized bed incinerator to maintain combustion therein;
   P. incinerating said solids and pulp in said incinerator to provide deodorized waste gas and sterile ash; and
   Q. passing exhaust gases from said reception zone, said macerator, said aeration zone, said flotation zone, and said feeding zone to said fluidized bed incinerator or to an afterburner to be deodorized to an inoffensive gas.

2. The method of claim 1 wherein all of said solid materials are converted to an incineratable form.

3. The method of claim 1 wherein said feeding zone is in said incinerator.

4. The method of claim 1 wherein said solid material is macerated to give said incineratable form.

5. The method of claim 1 wherein said solid material is hydropulped to give said incineratable form.

6. A method of disposing of domestic sewage wastes solid materials, and waste oil in a remotely situated land site or on board a ship employing a fluidized bed incinerator wherein said solid material is selected from the group consisting of combustible solid material, noncombustible solid material and mixtures thereof; and said waste oil being present in an amount sufficient to maintain combustion in said fluidized bed incinerator; which comprises:
   A. passing the sewage wastes into a reception zone;
   B. passing said sewage wastes after being collected in said reception zone to a macerator and macerating said sewage wastes in said macerator;
   C. passing said sewage to a feeding zone of said incinerator;
   D. passing said solid materials to a pulverizing zone and therein converting said solid material to an incineratable form in which said solid material is capable of being fed to the fluidized bed region of said fluidized bed incinerator;
   E. providing combustion conditions in said fluidized bed incinerator;
   F. passing said solid materials to said feeding zone;
   G. mixing said sewage and said solid material in said feeding zone of said incinerator;
   H. feeding the mixture obtained in step (G) directly to the fluidized bed region of said fluidized bed incinerator;
   I. introducing waste oil in an amount sufficient to maintain combustion in said fluidized bed incinerator;
   J. supplying air to said fluidized bed region of said fluidized bed incinerator to maintain combustion therein;
   K. incinerating said solids and pulp in said incinerator to provide deodorized waste gas and sterile ash; and
   L. passing exhaust gases from said reception zone, said macerator, said aeration zone, said flotation zone, and said feeding zone to said fluidized bed incinerator or to an afterburner to be deodorized to an inoffensive gas.

7. The method of claim 6 wherein all of said solid materials are converted to an incineratable form.

8. The method of claim 6 wherein said feeding zone is in said incinerator.

9. The method of claim 6 wherein said solid material is macerated to give said incineratable form.

10. The method of claim 6 wherein said solid material is hydropulped to give said incineratable form.

* * * * *